US005746231A

United States Patent [19]

Lesser et al.

[11] Patent Number: 5,746,231
[45] Date of Patent: May 5, 1998

[54] TOBACCO SMOKE FILTER FOR REMOVING TOXIC COMPOUNDS

[75] Inventors: Craig Lesser, 10724 Wilshire Blvd., #810, Los Angeles, Calif. 90024; Reid W. Von Borstel, Potomac, Md.

[73] Assignee: Craig Lesser, Middletown, Calif.

[21] Appl. No.: 648,314

[22] Filed: May 15, 1996

Related U.S. Application Data

[63] Continuation-in-part of Ser. No. 543,050, Oct. 13, 1995, abandoned, and Ser. No. 363,975, Dec. 13, 1994, Pat. No. 5,501,238, each is a continuation of Ser. No.2,951, Jan. 11, 1993, abandoned.

[51] Int. Cl.$^6$ .................................................. A24D 3/00
[52] U.S. Cl. .................... 131/334; 131/331; 131/335; 131/337
[58] Field of Search ............................ 131/331, 267, 131/10.7, 10.9, 262 R, 334, 335, 337; 521/99; 540/145; 534/11

[56] References Cited

U.S. PATENT DOCUMENTS

| | | | |
|---|---|---|---|
| 3,279,476 | 10/1966 | Noznick et al. | 131/334 |
| 3,313,305 | 4/1967 | Noznick et al. | 131/10.7 |
| 3,355,317 | 11/1967 | Keith, II et al. | 131/334 |
| 3,658,070 | 4/1972 | Diluzio | 131/267 |
| 3,674,540 | 7/1972 | Pergaminos | 117/56 |
| 3,884,246 | 5/1975 | Walker | 131/10.1 |
| 3,886,955 | 6/1975 | Johnson et al. | 131/261 R |
| 3,982,897 | 9/1976 | Scheinberg | 23/232 R |
| 4,037,607 | 7/1977 | Grossman | 131/10 R |
| 4,076,031 | 2/1978 | Grossman | 131/261 A |
| 4,092,333 | 5/1978 | Mookherjee et al. | 260/347.2 |
| 4,096,158 | 6/1978 | Evers et al. | 260/347.2 |
| 4,126,708 | 11/1978 | Mookherjee et al. | 426/535 |
| 4,138,413 | 2/1979 | Mookherjee et al. | 260/347.2 |
| 4,156,431 | 5/1979 | Epstein et al. | 131/10.7 |
| 4,194,517 | 3/1980 | Borowski | 131/261 R |
| 4,248,251 | 2/1981 | Bryant, Jr. et al. | 131/17 R |
| 4,257,430 | 3/1981 | Collins et al. | 131/140 B |
| 4,258,730 | 3/1981 | Tsukamoto | 131/170 R |
| 4,260,523 | 4/1981 | Tsukamoto | 252/447 |
| 4,333,484 | 6/1982 | Keritsis | 131/359 |
| 4,414,988 | 11/1983 | Yagi | 131/334 |
| 4,438,775 | 3/1984 | Mays et al. | 131/300 |
| 4,489,739 | 12/1984 | Mattina, Jr. et al. | 131/352 |
| 4,506,684 | 3/1985 | Keritsis | 131/369 |
| 4,508,525 | 4/1985 | Berger | 493/43 |
| 4,532,947 | 8/1985 | Caseley | 131/331 |
| 4,537,204 | 8/1985 | Gaisch et al. | 131/274 |
| 4,612,942 | 9/1986 | Dobberstein et al. | 131/276 |
| 4,761,277 | 8/1988 | Valdes et al. | 424/64 |
| 4,763,674 | 8/1988 | Lelah | 131/342 |
| 4,896,683 | 1/1990 | Cohen et al. | 131/342 |
| 4,946,968 | 8/1990 | Krimmer et al. | 548/534 |
| 4,964,426 | 10/1990 | Lee et al. | 131/342 |
| 5,009,239 | 4/1991 | Cohen et al. | 131/342 |
| 5,058,607 | 10/1991 | Carter et al. | 131/58 |
| 5,060,672 | 10/1991 | Irimi et al. | 131/331 |
| 5,218,096 | 6/1993 | Shibuya et al. | 536/41 |
| 5,249,588 | 10/1993 | Brown et al. | 131/291 |

FOREIGN PATENT DOCUMENTS

| | | | |
|---|---|---|---|
| A2149674 | 3/1973 | France | 131/334 |
| 2702234 | 7/1978 | Germany | 131/267 |
| 57-138375 | 8/1982 | Japan | 131/267 |
| 1163832 | 6/1985 | U.S.S.R. | 131/267 |
| 1305369 | 1/1973 | United Kingdom | 131/267 |
| 1435504 | 5/1976 | United Kingdom | 131/267 |

OTHER PUBLICATIONS

Hayatsu, Hikoya et al., "Porphyrins as potential inhibitors against exposure to carcinogens and mutagens," *Mutation Research* 290:79–85 (1993).

*Primary Examiner*—Vincent Millin
*Assistant Examiner*—Charles W. Anderson
*Attorney, Agent, or Firm*—David A. Farah; Sheldon & Mak

[57] ABSTRACT

A tobacco smoke filter comprising a porous substrate having a humectant, such as sodium pyroglutamate, dispersed therein to absorb moisture from the tobacco smoke thereby wet-filtering the tobacco smoke. The tobacco smoke filter can also comprise a porous substrate having microcapsules dispersed therein. The microcapsules can comprise a humectant such as sodium pyroglutamate. The microcapsules further preferably comprise one or more of methylcellulose, chlorophyllin and at least one vegetable oil. The tobacco smoke filter can also comprise a porous substrate having dry water and a porphyrin dispersed therein. The tobacco smoke filter can also comprise a porous substrate having a copper-containing porphyrin dispersed therein.

36 Claims, No Drawings

TOBACCO SMOKE FILTER FOR REMOVING TOXIC COMPOUNDS

CROSS-REFERENCE TO RELATED APPLICATIONS

The present application is a continuation-in-part of U.S. patent application Ser. No. 08/543,050, entitled CIGARETTE FILTER CONTAINING A HUMECTANT, filed Oct. 13, 1995, abandoned, and a continuation-in-part of U.S. patent application Ser. No. 08/363,975, now U.S. Pat. No. 5,501,238 entitled CIGARETTE FILTER CONTAINING A HUMECTANT, filed Dec. 13, 1994, both of which are continuations of U.S. patent application Ser. No. 08/002,951, entitled CIGARETTE FILTER CONTAINING A HUMECTANT, filed Jan. 11, 1993, now abandoned. The present application is also a continuation-in-part of Patent Cooperation Treaty Application, Ser. No. PCT/US95/16486, entitled CIGARETTE FILTER CONTAINING MICROCAPSULES, filed Dec. 19, 1995, which is a continuation-in-part of U.S. patent application Ser. No. 08/543,050, now abandoned the contents of each of which are incorporated herein by reference in their entirety.

BACKGROUND

It is widely known that tobacco smoke contains mutagenic and carcinogenic compounds which cause substantial morbidity and mortality to smokers. Examples of such substances include polycyclic aromatic hydrocarbons (PAH) and nitrosamines.

Polycyclic aromatic hydrocarbons appear to cause toxicity by intercalating within DNA molecules. Nitrosamines are electrophilic, alkylating agents which are potent carcinogens. Nitrosamines are not present in fresh or green tobaccos and are not formed during combustion. They are instead formed by reactions involving free nitrate during processing and storage of tobacco, or by the post-inhalation, metabolic activation of secondary amines present in tobacco smoke.

Attempts to reduce the amount of toxic and mutagenic compounds that reach the smoker include tobacco smoke filters positioned between the burning tobacco and the smoker. Conventional filters are made of cellulose acetate, with or without activated charcoal. These conventional filters, however, are only partially effective in reducing the amount of toxic and mutagenic compounds reaching the smoker. Further, conventional filters disadvantageously remove flavor compounds, thereby decreasing acceptance by the smoker.

There is, therefore, a need for an improved filter for a smokable device that substantially removes toxic and mutagenic compounds from tobacco smoke. Further, there is a need for an improved filter which allows the passage of flavor compounds while substantially removing toxic and mutagenic compounds from tobacco smoke. Such an improved filter would preferably be simple and inexpensive to manufacture, and convenient to use.

SUMMARY

The present invention is directed to a tobacco smoke filter that meets these needs. In one embodiment, the filter comprises a porous substrate having a humectant, such as sodium pyroglutamate, dispersed therein. The humectant absorbs moisture from the tobacco smoke and thus serves to wet-filter the tobacco smoke during use.

In another embodiment, the present invention is directed to a tobacco smoke filter comprising a porous substrate having a copper-containing porphyrin, or a copper-containing porphyrin and sodium pyroglutamate, dispersed therein. The present invention is further directed to a tobacco smoke filter consisting essentially of a copper-containing porphyrin dispersed therein.

In another embodiment, the present invention is directed to a tobacco smoke filter comprising a porous substrate having dry water and sodium pyroglutamate, or dry water and microcapsules, or dry water and a porphyrin, or dry water, microcapsules, and a porphyrin, dispersed therein. The present invention is further directed to a tobacco smoke filter consisting essentially of a porous substrate having dry water and sodium pyroglutamate, or dry water and microcapsules, or dry water and a porphyrin, or dry water, sodium pyroglutamate and a porphyrin, or dry water, microcapsules, and a porphyrin, dispersed therein.

In another embodiment, the present invention is directed to a tobacco smoke filter comprising a porous substrate having microcapsules dispersed therein. The microcapsules comprise a core and a shell. The shell comprises a humectant, preferably sodium pyroglutamate. The shell further preferably comprises methylcellulose. The core preferably comprises chlorophyllin. The core further preferably comprises at least one vegetable oil.

The filters of the present invention can additionally comprise at least one surfactant or at least one substance which aids in the removal of toxic and mutagenic compounds from tobacco smoke.

The filters of the present invention can be provided by themselves or in combination with a smokable device having a body of tobacco, such as a cigarette, cigar or pipe.

According to another embodiment of the present invention, there is provided a tobacco smoke filter according to the present invention affixed to a body of divided tobacco.

According to another embodiment of the present invention, there is provided a method of filtering tobacco in a smokable device, comprising the steps of, first providing a smokable device comprising the tobacco smoke filter according to the present invention, wherein the filter is affixed to a body of divided tobacco. Then, the body of divided tobacco is ignited such that smoke passes through the body and into the filter. Next, the smoke is allowed to pass through the filter thereby filtering the smoke.

According to another embodiment of the present invention, there is provided a method of making a smokable device, comprising the steps of, first providing a tobacco smoke filter according to the present invention. Next, the filter is affixed to a body of divided tobacco.

These and other features of the present invention will become better understood from the following description and appended claims.

DESCRIPTION

According to one embodiment of the present invention, there is provided a filter for tobacco smoke. The filter can be provided in combination with cigarettes or cigars or other smokable devices containing divided tobacco. Preferably, the filter is secured to one end of the smokable device, positioned such that smoke produced from the tobacco passes into the filter before entering the smoker. The filter can also be provided by itself, in a form suitable for attachment to a cigarette, cigar, pipe, or other smokable device.

The filter according to the present invention advantageously removes a significant proportion of mutagens and carcinogens from cigarette smoke. The filter further retains satisfactory or improved smoke flavor, nicotine content, and draw characteristics. The filter is designed to be acceptable to the user, being neither cumbersome nor unattractive as are commercially made filters which are designed to add onto the ends of premade cigarettes. Further, filters according to the present invention can be made of inexpensive, safe and effective components, and can be manufactured with only minor modifications of standard cigarette manufacturing machinery.

According to one embodiment of the present invention, the filter comprises a porous substrate. The porous substrate can be any nontoxic material suitable for use in filters for smokable devices that are also suitable for incorporation with the other substances according to embodiments of the present invention. Such porous substrates include cellulosic fiber such as cellulose acetate, cotton, wood pulp, and paper; and polyesters, polyolefins, ion exchange materials and other materials as will be understood by those with skill in the art with reference to the disclosure herein.

Filter Containing a Humectant

According to one embodiment of the present invention, the filter comprises at least one humectant, with or without other substances disclosed herein. The humectant is capable of absorbing moisture from tobacco smoke and releasing it into the porous substrate in order to wet-filter tobacco smoke that passes through the filter. Among other advantages, wet-filtration systems according to the present invention help remove particulate matter from tobacco smoke and can be made integral with a tobacco containing product.

The humectant can be any suitable humectant. For example, the humectant can be selected from the group consisting of glycerol, sorbitol, propylene glycol, sodium lactate, calcium chloride, potassium phosphate, sodium pyrophosphate or sodium polyphosphate, calcium citrate, calcium gluconate, potassium citrate, potassium gluconate, sodium tartrate, sodium potassium tartrate, and sodium glutamate.

In a preferred embodiment, the humectant incorporated into the filter is sodium pyroglutamate (also known as sodium 2-pyrrolidone-5-carboxylate or NaPCA). Advantageously, sodium pyroglutamate is nontoxic, effective at removing charged particles from tobacco smoke and functions as a humectant in the temperature range of tobacco smoke. Further, it is nonhazardous, stable, simple to manufacture and convenient to use. Sodium pyroglutamate has the following structure:

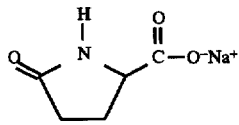

Filters according to the present invention are simple and inexpensive to manufacture. In one method of manufacture, a solution containing the humectant, such as sodium pyroglutamate, is prepared. Then, the porous substrate is wetted with the solution. The wetted substrate is then dried, leaving a residue of the humectant dispersed on or in the porous substrate. In a preferred embodiment, the humectant is present in an amount of from about 5 to about 60% by dry weight of the filter.

These and other advantages of the present invention are demonstrated by the following comparative example.

EXAMPLES I

Comparison of Effectiveness Between Conventional Tobacco Smoke Filter, Wet-Filtration Tobacco Smoke Filter Containing Sodium Pyroglutamate and Commercially Available Wet-Filtration Tobacco Smoke Filter Three types of filters were tested for relative effectiveness in removing tar from cigarette smoke:

1) Conventional cellulose acetate filter ("Cell-Ac");
2) Wet-filtration tobacco smoke filter containing cellulose acetate with sodium pyroglutamate ("SoPyro") according to the present invention; and
3) Commercially available wet-filtration tobacco smoke filter ("Aquafilter").

Cellulose acetate filters containing sodium pyroglutamate were prepared by, first, removing cellulosic filters from commercial cigarettes. The fibers weighed approximately 0.21 g. Next, approximately 0.5 ml of a 10% by weight solution of sodium pyroglutamate was applied to each filter, and the filter was dried overnight at 600° C.

The conventional cellulose acetate filter and the cellulose acetate filters containing sodium pyroglutamate were weighed and inserted into a 3.75 cm (1.5 inch) segment of polycarbonate tubing having an inside diameter identical to the outside diameter of a standard cigarette. A filterless cigarette having 0.85 g of tobacco was inserted into one end of the polycarbonate tubing in proximity to one end of the filter. The other end of the polycarbonate tubing was attached to tubing connected to a suction pump. Duplicates of each filter type were tested. Aquafilters used in this test were also attached to a filterless cigarette having 0.85 g of tobacco and then attached to tubing connected to a suction pump.

The filtered cigarettes were lit and intermittent suction, simulating inhalation of cigarette smoke, was applied until the cigarette had burned to within 0.5 inch of the unlit end. The filters were removed from either the polycarbonate tube or were removed from the Aquafilter, weighed, and placed in 10 ml of methanol to elute tar and other substances from the smoke that were retained in the filter. Light absorbance (at a wavelength of 350 nm) of the ethanolic filter eluates was used as an index of the amount of smoke components retained on the filters. The weight gained by the filters during smoke passage was also recorded. The results of the test are presented in Table 1.

TABLE 1

TABLE 1

| TEST | FILTER | ABSORBANCE at 350 nm | Weight Gain |
|---|---|---|---|
| 1 | Cell-Ac | 0.470 A.U. | 35 mg |
| 2 | Cell-Ac | 0.381 A.U. | 30 mg |
| 3 | SoPyro | 0.731 A.U. | 71 mg |
| 4 | SoPyro | 0.625 A.U. | 60 mg |
| 5 | Aquafilter | 0.540 A.U. | * |
| 6 | Aquafilter | 0.560 A.U. | * |

*The weight gain due to absorbance of smoke components on the Aquafilter could not be determined, since the Aquafilter actually lost weight during passage of smoke, presumably due to evaporation of water.

Based on the absorbance data, the filters according to one embodiment of the present invention (Tests 3 and 4) are significantly more effective than conventional cellulose acetate filters without the humectant (Tests 1 and 2), and also more effective than the Aquafilter (Tests 5 and 6).

Filter Containing Dry Water

According to another embodiment of the present invention, there is provided a filter for wet-filtering tobacco smoke comprising "dry water," with or without other substances disclosed herein. Dry water is a combination of methylated silica and water. In one embodiment, the methylated silica is present in an amount from about 5 to 40% and the water is present in an amount from about 60 to 95% by weight. In a preferred embodiment, the methylated silica is present in an amount of about 10% and the water is present in an amount of about 90% by weight. Advantageously, dry water has good stability when used in a filter according to the present invention. Further, it is inexpensive, nontoxic and not harmful to the environment.

In a preferred embodiment, dry water is present in an amount of about 1% to about 20% by weight of the filter. In a particularly preferred embodiment, dry water is present in an amount of about 5% to about 10% by weight of the filter.

Dry water for use with the present invention can be made, for example, by shaking excess water with methylated silica in a closed container until an equilibrium emulsion is achieved. Excess water is decanted, and a drying agent, such as non-derivatized silica, is added in amounts equivalent to 10% of the amount of methylated silica in the emulsion. The emulsion is further shaken to disperse the drying agent.

One problem associated with the use of dry water in a tobacco smoke filter is that, when present as a continuous layer between the tobacco and the smoker, dry water tends to clog pores in the filter, thereby increasing resistance to airflow and decreasing smoking pleasure. In order to overcome this problem, there is provided an embodiment of the present invention having dry water admixed with a loose fibrous material. This additional fibrous material provides scaffolding to reduce impaction of silica particles into the filter material when suction is applied by the smoker. Examples of such material include cellulose or cellulose acetate having fiber lengths short enough such that the dry water behaves as a flowable powder. In a preferred embodiment, the fiber length is less than about 1 mm. In a preferred embodiment, the tobacco smoke filter according to the present invention includes both a porphyrin, as discussed herein, in addition to the dry water. For example, a tobacco smoke filter according to the present invention includes a section of between about ⅛ and ¼ inch filled with dry water, chlorophyllin and cellulose, within the filter or at the distal end of the filter between the conventional filter material and the tobacco. Tobacco smoke in such a filter passes through the dry water and porphyrin which retain carcinogenic smoke constituents within the dry water and chlorophyllin layer.

Tobacco smoke filters according to this aspect of the present invention can be made by adding a dry water and porphyrin mixture during manufacture of the filter or can be made by injecting the mixture into the filter or at the interface between the tobacco and the conventional filter. The dry water and porphyrin mixture can be injected either into the axial end of the filter or through the side of the smokable device, such as through a cannula attached to an injection device. Preferably, the injection device meters the amount of material administered per each injection.

Alternately, the dry water and porphyrin mixture can be included in a filter extension for attachment to a conventional smokable device such as a standard cigarette, or to a cigarette filter by the smoker. The filter extension comprises a layer of dry water and porphyrin and, preferably, a fibrous material as a matrix. The filter extension further comprises a sleeve which extends axially forward for fitting over the proximal end of the smokable device. The sleeve is bounded by a porous retaining element to maintain the dry water and porphyrin within the filter extension. Preferably, the sleeve further comprises a length of conventional filter material such that, upon connection to the smokable device, the filter extension and smokable device appear to substantially be a conventional smokable device.

Filters Containing a Copper-containing Porphyrin

According to another embodiment of the present invention, there is provided a cigarette filter comprising at least one porphyrin, such as chlorophyll, with or without other substances disclosed herein. Preferably, the porphyrin is a copper-containing porphyrin, such as chlorophyllin and copper phthalocyanine trisulfonate (copper phthalocyanine, copper phthalocyanate).

Porphyrins are planar compounds which inactivate several classes of mutagens and carcinogens. Porphyrins inactivate planar mutagens and carcinogens primarily by binding the carcinogen to the planar porphyrin structure through hydrophobic interactions. Therefore, porphyrins ideally need to be maintained in aqueous environments to optimally adsorb these tobacco smoke carcinogens. Porphyrins further inactivate carcinogens by binding polycyclic aromatic hydrocarbons (PAH) through π—π (pi—pi) bonding. The copper-containing porphyrins also inactivate many classes of non-planar mutagens and carcinogens including some nitrosamines through reaction with the copper ion. While known to inactivate various carcinogens, it has not been known how to effectively utilize porphyrins in tobacco filters.

Chlorophyllin is a naturally occurring, copper-containing porphyrin and is the stable form of chlorophyll in which the magnesium present in chlorophyll has been replaced by copper. Chlorophyllin has the following formula:

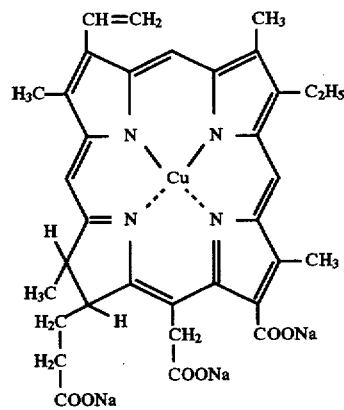

Chlorophyllin

Chlorophyllin, however, is difficult to chemically link to tobacco filter components. Therefore, in a preferred embodiment, the copper-containing porphyrin incorporated into the tobacco smoke filter is copper phthalocyanine. Copper phthalocyanine is a nontoxic, synthetic chlorophyllin analog which can be more easily linked to tobacco filter components than chlorophyllin. Copper phthalocyanine has the following formula:

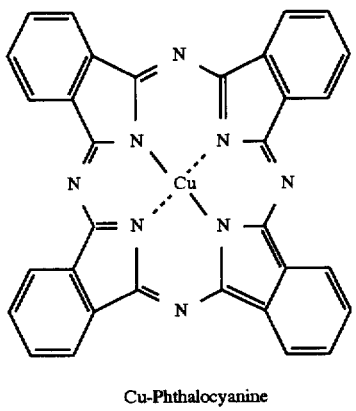

Cu-Phthalocyanine

Copper phthalocyanine can be incorporated into a tobacco smoke filter by directly adding the copper phthalocyanine to the tobacco smoke filter. In a preferred embodiment, the copper phthalocyanine can be incorporated into a tobacco smoke filter as a covalently bound ligand to cotton, such as "blue cotton," to rayon, such as "blue rayon," or to other suitable material. In another preferred embodiment, copper phthalocyanine can be incorporated into a tobacco smoke filter in combination with other tobacco smoke filter embodiments of the present invention. Copper phthalocyanine is attached to cellulosic fibers in the form of an activated reagent called C.I. Reactive Blue 21, as described in Hayatsu, Journal of Chromatography, 597:37–56 (1992), incorporated herein by reference in its entirety, which forms a stable ether linkage to free hydroxyl groups on cellulosic fibers or other materials under mild conditions (unlike chlorophyllin and other porphyrins).

In a preferred embodiment, the copper phthalocyanine is present in an amount of from about 0.1 to about 5% by dry weight of the filter whether free or covalently bound. In a particularly preferred embodiment, the copper phthalocyanine is present in an amount of from about 1 to about 3% by dry weight of the filter.

Filter Containing Microcapsules

According to another embodiment of the present invention, there is provided a filter for tobacco smoke comprising a porous substrate having microcapsules dispersed therein, with or without other substances disclosed herein. The microcapsules preferentially include an inner core with an outer shell.

The cores of the microcapsules comprise at least one vegetable oil. Suitable vegetable oils include at least one oil selected from the group consisting of castor oil, cotton seed oil, corn oil, sunflower oil, sesame oil, soybean oil, and rape oil. In a preferred embodiment, the vegetable oil is safflower oil. Other oils are also suitable, as will be understood by those with skill in the art with reference to the disclosure herein. In a preferred embodiment, the vegetable oil is present in an amount of from about 20 to about 80% by dry weight of the microcapsules, and more preferably from about 30 to about 70% by dry weight of the microcapsules.

In a preferred embodiment, the microcapsule cores also contain a porphyrin, such as chlorophyllin, or another porphyrin such copper phthalocyanine. When present, the chlorophyllin is preferably present in an amount of from about 1 to about 10% by dry weight of the microcapsules, and more preferably from about 2 to about 5% by dry weight of the microcapsules.

The microcapsule shells comprise a humectant. In a preferred embodiment, the humectant is sodium pyroglutamate, though other humectants can be used as will be understood by those with skill in the art with reference to the disclosure herein. In a preferred embodiment, the humectant, such as sodium pyroglutamate, is present in an amount of from about 10 to about 90% by dry weight of the microcapsules, and more preferably from about 20 to about 70% by dry weight of the microcapsules.

In another preferred embodiment, the microcapsule shells also comprise methylcellulose. In a preferred embodiment, the methylcellulose is present in an amount of from about 5 to about 30% by dry weight of the microcapsules, and more preferably from about 10 to about 25 by dry weight of the microcapsules.

In another preferred embodiment, the microcapsule shells also comprise a polymeric agent such as polyvinylalcohol or polyvinyl pyrrolidone, or can comprise both polyvinylalcohol and polyvinyl pyrrolidone, in addition to methylcellulose or in place of methylcellulose. In a preferred embodiment, the polymeric agent is present in an amount of from about 2 to about 30% by dry weight of the microcapsules, and more preferably from about 5 to about 20% by dry weight of the microcapsules.

Compounds used in formulation of microcapsules according to the present invention are available from a variety of sources known to those with skill in the art, such as Sigma Chemical Co., St. Louis, Mo. USA.

Microcapsules suitable for use in the present invention can be made according to a variety of methods known to those with skill in the art. For example, microcapsules according to the present invention can be produced by combining 200 g of vegetable oil with 500 g of an aqueous suspension comprising 25 g of low-viscosity methylcellulose, 5 g of chlorophyllin, 50 g of sodium pyroglutamate and 150 g of corn starch in water. The mixture is emulsified and spray-dried to form microcapsules.

Microcapsules according to the present invention can be formed by spray drying methods at the site of cigarette manufacturing machinery by spraying onto sheets of cellulose acetate filter tow before the tow is formed into cylindrical filters. Alternatively, suitable microcapsules can be premanufactured and added to sheets of cellulose acetate filter tow by dropping the microcapsules onto the tow with a vibrating pan or by other techniques as will be understood by those with skill in the art with reference to the disclosure herein. Further, microcapsules can be incorporated into prefabricated filters by sprinkling the microcapsules into the filter tow before the tow is rolled and shaped in rods of filter material.

As will be appreciated by those with skill in the art, the manufacture of filters containing microcapsules according to the present invention will require only minor modification of conventional filter-cigarette manufacturing equipment. Further, the manufacture of filters containing microcapsules according to the present invention is only marginally more expensive than conventional filters.

In use, the humectant portions of the microcapsules trap moisture from tobacco smoke passing through the filter. Sodium pyroglutamate is particularly preferred because it can be incorporated into the filter in a dry form.

When present, the oil portions of the microcapsules trap certain harmful volatile compounds like pyridine without impeding the flow of flavor and aroma producing compounds. When present, chlorophyllin is a potent inactivator of carcinogenic components of tobacco smoke.

The methylcellulose portions of the microcapsules impart structural stability to the microcapsules but disperse upon warming and when exposed to moisture. Unlike most commonly used viscosity-imparting substances, methylcellulose precipitates from warm solutions. Further, it is soluble at lower temperatures than most commonly used viscosity-imparting substances.

When tobacco smoke filters containing microcapsules comprising a shell of sodium pyroglutamate and methylcellulose and a core of vegetable oil and chlorophyllin, according to the present invention, filter tobacco smoke, the microcapsules capture heat and moisture from the tobacco smoke. The methylcellulose precipitates into a fibrous material which increases the effective surface area available for wet-filtration of the tobacco smoke. This allows the moisture retained by the sodium pyroglutamate to rapidly disperse into the filter material. The chlorophyllin partitions approximately evenly between the aqueous and oil environments, allowing increased inactivation of both particulate and vapor-phase toxic and mutagenic compounds of tobacco smoke than if the chlorophyllin was available in only one phase.

Filters Containing a Surfactant

In another preferred embodiment, the filters of the present invention additionally comprise at least one surfactant to improve the effectiveness of the tobacco smoke filter, with or without other substances disclosed herein. In a particularly preferred embodiment, the surfactant is present in an amount of from about 0.1 to about 10%, and more preferably from about 0.1 to about 2% by weight of the filter.

The surfactant is preferably nontoxic and can include one or more of the following classes of compounds: (1) a polyoxyalkylene derivative of a sorbitan fatty acid ester (i.e., polyoxyalkylene sorbitan esters), (2) a fatty acid monoester of a polyhydroxy-alcohol, or (3) a fatty acid diester of a polyhydroxy alcohol, though other suitable surfactants will be understood by those with skill in the art with reference to the disclosure herein. Examples of suitable surfactants include ethoxylates, carboxylic acid esters, glycerol esters, polyoxyethylene esters, anhydrosorbitol esters, ethoxylated anhydrosorbitol esters, ethoxylated natural fats, oils and waxes, glycol esters of fatty acids, polyoxyethylene fatty acid amides, polyalkylene oxide block copolymers, and poly(oxyethylene-consist of-oxypropylene). Other suitable surfactants can also be used as will be understood by those with skill in the art with reference to the disclosure herein.

Filters Containing an Additional Substance

The filter can additionally include one or more other substances which filter or inactivate toxic or mutagenic components of tobacco smoke. Examples of such substances include antioxidant and radical scavengers such as glutathione, cysteine, N-acetylcysteine, mesna, ascorbate, and N,N'-diphenyl-p-phenyldiamine; aldehyde inactivators such as ene-diol compounds, amines, and aminothiols; nitrosamine traps and carcinogen inactivators such as ion-exchange resins, chlorophyll; and nicotine traps such as tannic acid and other organic acids. In one preferred embodiment, the filter includes colloidal silica, a compound which can scavenge secondary amines from tobacco smoke, thereby preventing conversion of the secondary amines to nitrosamines in the body. Other suitable substances can also be used as will be understood by those with skill in the art with reference to the disclosure herein. In a preferred embodiment, the other substances are present in an amount of from about 0.1 to about 10%, and more preferably from about 0.1 to about 2% by weight of the filter.

Filters Having Certain Combinations of Substances Disclosed Herein

According to another embodiment of the present invention, there is provided a tobacco smoke filter comprising combinations of substances disclosed herein. In a preferred embodiment, the filter comprises a humectant, such as sodium pyroglutamate, in combination with dry water. This combination functions synergistically to improve wet-filtration of tobacco smoke. In one embodiment, the filter comprises sodium pyroglutamate in an amount of between about 1% and 20% of the aqueous portion of the dry water by weight. In a preferred embodiment, the filter comprises sodium pyroglutamate in an amount of between about 5% and 10% of the aqueous portion of the dry water by weight.

In another preferred embodiment, the filter comprises a copper-containing porphyrin, such as copper phthalocyanine, in combination with a humectant such as sodium pyroglutamate, dry water or both. These combinations are particularly preferred because copper-containing porphyrins scavenge carcinogens better in aqueous environments. In one embodiment, the copper-containing porphyrin comprises between about 0.5% to about 5% of the dry water by weight.

In another preferred embodiment, the filter comprises chlorophyllin, in combination with a humectant, dry water or both. In one embodiment, the chlorophyllin comprises between about 0.5% to about 5% of the dry water and the humectant is between about 1% and 20% of the dry water by weight.

A specific example of such a combination would be blue rayon (copper phthalocyanine impregnated rayon) combined with dry water. When present in an amount between about 10 to 100 mg in the 0.30 cm tobacco end of a standard cellulose acetate tobacco filter, the combination does not impair draw but reduces mutagenicity of tobacco smoke 75–80% by the Ames test. Further, these components are inexpensive, safe, and not harmful to the environment.

Combinations of dry water and porphyrin are produced, for example, by adding dry porphyrin in amounts up to the amount of methylated silica by weight to dry water, made according the description herein. The porphyrin must be added after the dry water has been stably emulsified. Dissolution of porphyrin in water prior to emulsification in methylated silica results in an unstable porphyrin/dry water compound. In a preferred embodiment, the porphyrin is added in amounts of about 0.1 to 0.5 grams per gram of methylated silica. A similar method is used to produce the combination of dry water and porphyrin-derivatized fiber, such as blue cotton or blue rayon. After combining the two substances, the combination is shaken or stirred to homogeneity.

Filters Having a Circumferential Barrier

Filters according to the present invention are preferably provided with an exterior, circumferential, moisture-impervious barrier or casing to prevent wetting of the smoker's hands. Such a barrier can be made from a polymeric material such as ethylvinyl acetate copolymer, polypropylene, or nylon, as is understood by those with skill in the art.

Position of Substances within Filters

The substances disclosed herein can be incorporated into filters according to the present invention in a variety of configurations. For example, the substance or substances can be dispersed throughout the filter in a substantially uniform manner. Alternately, the substance or substances can be dispersed in only one segment of the filter such as in the proximal third (the end nearest the smoker), in the middle third or in the distal third (the end nearest the tobacco).

In another embodiment, at least one substance is dispersed in one segment of the filter and at least one other substance is dispersed in a different segment of the filter. The two segments can have overlapping areas. For example, a filter according to the present invention can have dry water dispersed in the distal third of the filter and a copper-containing porphyrin dispersed in the proximal third of the filter. Also for example, a filter according to the present invention can have microcapsules dispersed in the distal half of the filter and sodium pyroglutamate dispersed in the proximal two-thirds of the filter, such that the two substances are dispersed in an overlapping area of the filter as well as nonoverlapping areas.

In another embodiment, the substance or substances can be incorporated into a filter that is then affixed to an end of a standard tobacco smoke filter. In a preferred embodiment, the substance or substances are incorporated into a tobacco smoke filter that resembles a shortened version of a standard tobacco smoke filter, and the shortened filter is then affixed to an end of a standard tobacco smoke filter. In this embodiment, the user will not be overtly aware of the additional shortened filter because of its resemblance in construction to a standard filter, unlike commercially available filters which add onto the proximal end of a smokable device.

Further, the substance or substances according to the present invention can be incorporated into a layer of the filter between the fibrous material making up the remainder of the filter, and the body of divided tobacco.

Smokable Devices Incorporating Filters According to the Present Invention

According to another embodiment of the present invention, there is provided a smokable device comprising a tobacco smoke filter as disclosed herein affixed to a body of divided tobacco. For example, such a smokable device can be a cigarette incorporating a filter containing microcapsules having sodium pyroglutamate dispersed therein.

Method of Filtering Tobacco

According to another embodiment of the present invention, there is provided a method of filtering tobacco in a smokable device. The method comprises the steps of, first, providing a smokable device comprising the tobacco smoke filter according to the present invention, wherein the filter is affixed to a body of divided tobacco. Next, the body of divided tobacco is ignited such that smoke passes through the body and into the filter. Then, the smoke is allowed to pass through the filter thereby filtering the smoke.

Method of Making a Smokable Device

According to another embodiment of the present invention, there is provided a method of making a smokable device. The method comprises the steps of, first, providing a tobacco smoke filter according to the present invention. Next, the filter is affixed to a body of divided tobacco.

Although the present invention has been discussed in considerable detail with reference to certain preferred embodiments thereof, other embodiments are possible. Therefore, the spirit and scope of the appended claims should not be limited to the description of the preferred embodiments contained herein.

We claim:

1. A tobacco smoke filter comprising a porous substrate having copper phthalocyanine dispersed therein.

2. The filter of claim 1, wherein the porous substrate additionally has microcapsules dispersed therein.

3. The filter of claim 2, wherein microcapsules comprise sodium pyroglutamate.

4. The filter of claim 2, wherein microcapsules comprise methylcellulose.

5. The filter of claim 1, wherein the porous substrate additionally has dry water dispersed therein.

6. The filter of claim 1, wherein the porous substrate additionally has dry water and microcapsules dispersed therein.

7. The filter of claim 1, wherein the porous substrate additionally has dry water and sodium pyroglutamate dispersed therein.

8. The filter of claim 1, wherein the porous substrate additionally has sodium pyroglutamate dispersed therein.

9. A smokable device comprising the tobacco smoke filter according to claim 1, wherein the filter is affixed to a body of divided tobacco.

10. A method of filtering tobacco in a smokable device, comprising the steps of:
 (a) providing a smokable device comprising the tobacco smoke filter according to claim 1, wherein the filter is affixed to a body of divided tobacco;
 (b) igniting the body of divided tobacco such that smoke passes through the body and into the filter; and
 (c) allowing the smoke to pass through the filter thereby filtering the smoke.

11. A method of making a smokable device, comprising the steps of:
 (a) providing a tobacco smoke filter according to claim 1; and
 (b) affixing the filter to a body of divided tobacco.

12. A tobacco smoke filter consisting essentially of a porous substrate having copper phthalocyanine dispersed therein.

13. A smokable device comprising the tobacco smoke filter according to claim 12, wherein the filter is affixed to a body of divided tobacco.

14. A method of filtering tobacco in a smokable device, comprising the steps of:
 (a) providing a smokable device comprising the tobacco smoke filter according to claim 7, wherein the filter is affixed to a body of divided tobacco;
 (b) igniting the body of divided Tobacco such that smoke passes through the body and into the filter; and
 (c) allowing the smoke to pass through the filter thereby filtering the smoke.

15. A method of making a smokable device comprising the steps of:
 (a) providing a tobacco smoke filter according to claim 7; and
 (b) affixing the filter to a body of divided tobacco.

16. A tobacco smoke filter consisting essentially of a porous substrate having a copper-containing porphyrin and microcapsules dispersed therein.

17. The filter of claim 16, wherein microcapsules comprise sodium pyroglutamate.

18. The filter of claim 16, wherein microcapsules comprise methylcellulose.

19. A smokable device comprising the tobacco smoke filter according to claim 16, wherein the filter is affixed to a body of divided tobacco.

20. A method of making a smokable device, comprising the steps of:
   (a) providing a tobacco smoke filter according to claim 16; and
   (b) affixing the filter to a body of divided tobacco.

21. A tobacco smoke filter consisting essentially of a porous substrate having copper phthalocyanine an dry water dispersed therein.

22. A smokable device comprising the tobacco smoke filter according to claim 21, wherein the filter is affixed to a body of divided tobacco.

23. A method of filtering tobacco in a smokable device, comprising the steps of:
   (a) providing a smokable device comprising the tobacco smoke filter according to claim 21, wherein the filter is affixed to a body of divided tobacco;
   (b) igniting the body of divided tobacco such that smoke passes through the body and into the filter; and
   (c) allowing the smoke to pass through the filter thereby filtering the smoke.

24. A method of making a smokable device, comprising the steps of:
   (a) providing a tobacco smoke filter according to claim 21; and
   (b) affixing the filter to a body of divided tobacco.

25. A tobacco smoke filter consisting essentially of a porous substrate having copper phthalocyanine, dry water and microcapsules dispersed therein.

26. A smokable device comprising the tobacco smoke filter according to claim 25, wherein the filter is affixed to a body of divided tobacco.

27. A method of filtering tobacco in a smokable device, comprising the steps of:
   (a) providing a smokable device comprising the tobacco smoke filter according to claim 25, wherein the filter is affixed to a body of divided tobacco;
   (b) igniting the body of divided tobacco such that smoke passes through the body and into the filter; and
   (c) allowing the smoke to pass through the filter thereby filtering the smoke.

28. A method of making a smokable device, comprising the steps of
   (a) providing a tobacco smoke filter according to claim 25; and
   (b) affixing the filter to a body of divided tobacco.

29. A tobacco smoke filter consisting essentially of a porous substrate having copper phthalocyanine and sodium pyroglutamate dispersed therein.

30. A smokable device comprising the tobacco smoke filter according to claim 29, wherein the filter is affixed to a body of divided tobacco.

31. A method of filtering tobacco in a smokable device, comprising the steps of:
   (a) providing a smokable device comprising the tobacco smoke filter according to claim 29, wherein the filter is affixed to a body of divided tobacco;
   (b) igniting the body of divided tobacco such that smoke passes through the body and into the filter; and
   (c) allowing the smoke to pass through the filter thereby filtering the smoke.

32. A method of making a smokable device, comprising the steps of:
   (a) providing a tobacco smoke filter according to claim 29; and
   (b) affixing the filter to a body of divided tobacco.

33. A tobacco smoke filter consisting essentially of a porous substrate having copper phthalocyanine, dry water and sodium pyroglutamate dispersed therein.

34. A smokable device comprising the tobacco smoke filter according to claim 33, wherein the filter is affixed to a body of divided tobacco.

35. A method of filtering tobacco in a smokable device, comprising the steps of:
   (a) providing a smokable device comprising the tobacco smoke filter according to claim 33, wherein the filter is affixed to a body of divided tobacco;
   (b) igniting the body of divided tobacco such that smoke passes through the body and into the filter; and
   (c) allowing the smoke to pass through the filter thereby filtering the smoke.

36. A method of making a smokable device, comprising the steps of:
   (a) providing a tobacco smoke filter according to claim 33; and
   (b) affixing the filter to a body of divided tobacco.

* * * * *

UNITED STATES PATENT AND TRADEMARK OFFICE
CERTIFICATE OF CORRECTION

PATENT NO : 5,746,231

DATED : May 5, 1998

INVENTOR(S): Lesser et al.

It is certified that error appears in the above-identified patent and that said Letters Patent is hereby corrected as shown below:

On cover page, Replace "[63] Continuation-in-part of Ser. No. 543,050, Oct. 13, 1995, abandoned, and Ser. No. 363,975, Dec. 13, 1994, Pat. No. 5,501,238, each is a continuation of Ser. No.2,951, Jan. 11, 1993, abandoned." with --[63] Continuation-in-part of Ser. No. 543,050, Oct. 13, 1995, and Ser. No. 363,975, Dec. 13, 1994, Pat. No. 5,501,238, each is a continuation of Ser. No. 2,951, Jan. 11, 1993, abandoned.--

Column 1, lines 4-21: Replace "The present application is a continuation-in-part of U.S. patent application Ser. No. 08/543,050, entitled CIGARETTE FILTER CONTAINING A HUMECTANT, filed Oct. 13, 1995, abandoned, and a continuation-in-part of U.S. patent application Ser. No. 08/363,975, now U.S. Pat. No. 5,501,238 entitled CIGARETTE FILTER CONTAINING A HUMECTANT, filed Dec. 13, 1994, both of which are continuations of U.S. patent application Ser. No. 08/002,951, entitled CIGARETTE FILTER CONTAINING A HUMECTANT, filed Jan. 11, 1993, now abandoned. The present application is also a continuation-in-part of Patent Cooperation Treaty Application, Ser. No. PCT/US95/16486, entitled CIGARETTE FILTER CONTAINING MICROCAPSULES, filed Dec. 19, 1995, which is a continuation-in-part of U.S. patent application Ser. No. 08/543,050, now abandoned the contents of each of which are incorporated hereby by reference in their entirety." with --The present application is a continuation-in-part of U.S. patent application Ser. No. 08/543,050, entitled CIGARETTE FILTER CONTAINING A HUMECTANT, filed Oct. 13, 1995, and a continuation-in-part of U.S. patent application Ser. No. 08/363,975, now U.S. Pat. No. 5,501,238, entitled CIGARETTE FILTER CONTAINING A HUMECTANT, filed Dec. 13, 1994, both of which are continuations of U.S. patent application Ser. No. 08/002,951, entitled CIGARETTE FILTER CONTAINING A HUMECTANT, filed Jan. 11, 1993, now abandoned. The present application is also a continuation-in-part of Patent Cooperation Treaty

UNITED STATES PATENT AND TRADEMARK OFFICE
CERTIFICATE OF CORRECTION

PATENT NO. : 5,746,231
DATED : May 5, 1998
INVENTOR(S) : Lesser et al.

It is certified that error appears in the above-indentified patent and that said Letters Patent is hereby corrected as shown below:

Application, Ser. No. PCT/US95/16486, entitled CIGARETTE FILTER CONTAINING MICROCAPSULES, filed Dec. 19, 1995, which is a continuation-in-part of U.S. patent application Ser. No. 08/543,050, the contents of each of which are incorporated hereby by reference in their entirety.--

Signed and Sealed this

Eleventh Day of August 1998

*Attest:*

BRUCE LEHMAN

*Attesting Officer*  Commissioner of Patents and Trademarks

UNITED STATES PATENT AND TRADEMARK OFFICE
CERTIFICATE OF CORRECTION

PATENT NO. : 5,746,231
DATED : May 5, 1998
INVENTOR(S) : Craig Lesser and Reid W. Von Borstel It is certified that error appears in the above-identified patent and that said Letters Patent is hereby corrected as shown below:

Column 12, Claim 14:   Replace:
"A method of filtering tobacco in a smokable device, comprising the steps of:
 (a) providing a smokable device comprising the tobacco smoke filter according to claim 7, wherein the filter is affixed to a body of divided tobacco;
 (b) igniting the body of divided Tobacco such that smoke passes through the body and into the filter; and
 (c) allowing the smoke to pass through the filter thereby filtering the smoke."

with:

--A method of filtering tobacco in a smokable device, comprising the steps of:
 (a) providing a smokable device comprising the tobacco smoke filter according to claim 12, wherein the filter is affixed to a body of divided tobacco;
 (b) igniting the body of divided Tobacco such that smoke passes through the body and into the filter; and
 (c) allowing the smoke to pass through the filter thereby filtering the smoke.--.

Column 12, Claim 15: Replace "A method of making a smokable device comprising the steps of:
 (a) providing a tobacco smoke filter according to claim 7; and
 (b) fixing the filter to a body of divided tobacco."

UNITED STATES PATENT AND TRADEMARK OFFICE
CERTIFICATE OF CORRECTION

PATENT NO. : 5,746,231
DATED : May 5, 1998
INVENTOR(S) : Craig Lesser and Reid W. Von Borstel It is certified that error appears in the above-identified patent and that said Letters Patent is hereby corrected as shown below:

with:

--A method of making a smokable device comprising the steps of:
(a) providing a tobacco smoke filter according to claim 12; and
(b) affixing the filter to a body of divided tobacco.--.

Signed and Sealed this

Sixteenth Day of March, 1999

*Attest:*

*Attesting Officer*

Q. TODD DICKINSON

Acting Commissioner of Patents and Trademarks